US012649516B2

(12) United States Patent
Higashi et al.

(10) Patent No.: US 12,649,516 B2
(45) Date of Patent: Jun. 9, 2026

(54) STEERING CONTROL SYSTEM FOR TWO-WHEELED VEHICLE

(71) Applicant: Yamaha Hatsudoki Kabushiki Kaisha, Shizuoka (JP)

(72) Inventors: Tomoyuki Higashi, Shizuoka (JP); Mitsuharu Hasumi, Shizuoka (JP); Tatsuya Moriguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 9 days.

(21) Appl. No.: 18/905,118

(22) Filed: Oct. 2, 2024

(65) Prior Publication Data

US 2025/0115292 A1 Apr. 10, 2025

(30) Foreign Application Priority Data

Oct. 6, 2023 (JP) ................................. 2023-174581

(51) Int. Cl.
*B62D 6/00* (2006.01)
*B62D 5/04* (2006.01)
(52) U.S. Cl.
CPC ............. *B62D 6/00* (2013.01); *B62D 5/0442* (2013.01); *B62D 5/0463* (2013.01)
(58) Field of Classification Search
CPC ...... B62D 6/00; B62D 5/0442; B62D 5/0463; B62K 21/00; B62K 3/00; B62J 45/4151
See application file for complete search history.

(56) References Cited

U.S. PATENT DOCUMENTS

| | | | | |
|---|---|---|---|---|
| 7,006,901 | B2 * | 2/2006 | Wang ..................... | B62J 45/412 |
| | | | | 701/1 |
| 7,497,294 | B2 * | 3/2009 | Tsujii ..................... | B62K 11/06 |
| | | | | 180/219 |
| 7,648,000 | B2 * | 1/2010 | Kimura ................ | B62K 25/005 |
| | | | | 180/219 |
| 7,717,225 | B2 | 5/2010 | Saito et al. | |
| 8,620,525 | B2 | 12/2013 | Araki et al. | |
| 9,132,880 | B2 * | 9/2015 | Takenaka ............... | B62K 21/10 |
| 9,932,064 | B1 * | 4/2018 | Dyar ..................... | B62K 21/02 |
| 11,014,600 | B2 | 5/2021 | Hara et al. | |

(Continued)

FOREIGN PATENT DOCUMENTS

| | | | |
|---|---|---|---|
| JP | 2990405 | B2 | 12/1999 |
| JP | 2006062535 | A | 3/2006 |

(Continued)

OTHER PUBLICATIONS

Office Actions of Jun. 3, 2025, for the corresponding JP Patent Application No. 2023-174581, pp. 1-6.

(Continued)

*Primary Examiner* — Grant Moubry
*Assistant Examiner* — Sherman D Manley
(74) *Attorney, Agent, or Firm* — HEA Law PLLC

(57) ABSTRACT

A control device calculates assistive torque that is directed in a direction corresponding to a roll angular velocity detected by a sensor and has a magnitude corresponding to the roll angular velocity, and controls an actuator that applies the torque to a steering shaft based on the assistive torque. This allows appropriate torque to be applied to the steering shaft of a two-wheeled vehicle while avoiding problems specific to a torque sensor.

13 Claims, 11 Drawing Sheets

(56) References Cited

U.S. PATENT DOCUMENTS

| | | | | |
|---|---|---|---|---|
| 12,139,230 | B2 * | 11/2024 | Ogahara | B62K 21/08 |
| 2006/0085111 | A1 * | 4/2006 | Kojima | A63H 17/16 |
| | | | | 701/41 |
| 2007/0010919 | A1 * | 1/2007 | Ammon | B60T 8/1706 |
| | | | | 701/1 |
| 2009/0139793 | A1 * | 6/2009 | Suzuki | B62K 21/00 |
| | | | | 180/446 |
| 2014/0188341 | A1 * | 7/2014 | Takenaka | B62J 45/4151 |
| | | | | 701/41 |
| 2019/0210644 | A1 * | 7/2019 | Uchiyama | B62J 45/414 |
| 2021/0179225 | A1 * | 6/2021 | Hara | B62D 37/00 |
| 2023/0136706 | A1 | 5/2023 | Higashi et al. | |
| 2025/0018929 | A1 | 1/2025 | Nose et al. | |

FOREIGN PATENT DOCUMENTS

| | | | |
|---|---|---|---|
| JP | 2007503358 | A | 2/2007 |
| JP | 2011005935 | A | 1/2011 |
| JP | 2012076502 | A | 4/2012 |
| JP | 5418512 | B2 | 2/2014 |
| JP | 5466126 | B2 | 4/2014 |
| JP | 2014091506 | A | 5/2014 |
| JP | 5883298 | B2 | 3/2016 |
| JP | 2020158067 | A | 10/2020 |
| JP | 2023068543 | A | 5/2023 |
| WO | 2017057514 | A1 | 4/2017 |
| WO | 2017086472 | A1 | 5/2017 |
| WO | 2022059116 | A1 | 3/2022 |
| WO | 2023095412 | A1 | 6/2023 |

OTHER PUBLICATIONS

Office Actions of Jun. 3, 2025, for the related JP Patent Application No. 2023-174582, pp. 1-5.

* cited by examiner (1)

$\Delta\theta = a$ (2)

$\theta 1$ $\Delta\theta = 0$

1

$\Delta\theta = -b$ $\theta 2$ (3)

STEERING CONTROL SYSTEM FOR TWO-WHEELED VEHICLE

CROSS-REFERENCE TO RELATED APPLICATION

The present application claims priority from Japanese application No. 2023-174581 filed on Oct. 6, 2023, the content of which is hereby incorporated by reference into this application.

BACKGROUND OF THE INVENTION

1. Field of the Invention

The present disclosure relates to a steering control system of a two-wheeled vehicle.

2. Description of the Related Art

A bicycle having a front basket capable of carrying a bag or an infant on a steering handle is used. As the load on the front basket increases, the force required to rotate the handle at the start of turning of the vehicle or return the handle to the neutral position increases.

JP2011-005935A proposes a technique for keeping the force required to operate a handle constant. JP2011-005935A describes the bicycle includes a handle operation pressure detecting device for detecting a pressure between a handle lever and a palm and an electric motor (referred to as "load device" in JP2011-005935A) attached to a steering shaft. The torque corresponding to a difference between the desired handle operation pressure and the handle operation pressure detected by the detector is applied from the electric motor to the steering shaft.

SUMMARY OF THE INVENTION

The pressure between the handle lever and the palm increases not only when the handle is operated, but also when a brake operation (e.g., operation of sequentially gripping the left handle brake and the right handle brake) is performed. As such, the pressure between the handle lever and the palm may increase regardless of whether to rotate the steering shaft.

One of the objects of the present disclosure is to apply appropriate torque to a steering shaft using a different method from a method for detecting an operation pressure on a handle.

(1) A steering control system proposed in the present disclosure includes an actuator that applies torque to a steering shaft, a sensor that detects a roll angular velocity of a vehicle body, and a control device that calculates assistive torque, which is directed in a direction corresponding to the detected roll angular velocity and has a magnitude corresponding to the roll angular velocity, and controls the actuator based on the assistive torque. This configuration enables the application of appropriate torque to the steering shaft without detecting an operation pressure on a steering handle.

(2) In the steering control system of (1), in a case where the roll angular velocity in a right direction is detected, the control device may calculate assistive torque in a direction in which the steering shaft is rotated to right. In a case where the roll angular velocity in a left direction is detected, the control device may calculate assistive torque in a direction in which the steering shaft is rotated to left. This serves to apply the torque in an appropriate direction to the steering shaft.

(3) In the steering control system of (2), the control device may calculate the assistive torque in a direction in which the steering shaft is rotated to the left in a case where a roll angular velocity in the left direction is detected while the vehicle body is tilted to the right direction from a vertical posture. The control device may calculate the assistive torque in a direction in which the steering shaft is rotated to the right in a case where a roll angular velocity in the right direction is detected while the vehicle body is tilted to the left direction from the vertical posture. This serves to apply the torque for returning the vehicle body to the vertical posture to the steering shaft.

(4) In the steering control system according to any one of (1) to (3), the assistive torque calculated by the control device may increase as the roll angular velocity increases. This serves to apply the torque corresponding to the increase in the roll angular velocity to the steering shaft.

(5) In the steering control system of (4), in a case where an absolute value of the roll angular velocity is lower than a threshold value, the assistive torque calculated by the control device may be substantially zero. This serves to prevent the assistive torque from being applied to the steering shaft due to a minute change in the roll angular velocity.

(6) In the steering control system according to any one of (1) to (5), the control device may calculate resistive torque, which is directed in a direction opposite to a direction in which the steering shaft is rotated from a neutral position and corresponds to a roll angle of the vehicle or a rotation angle of the steering shaft. The control device may calculate output torque to be applied to the steering shaft based on the assistive torque and the resistive torque. This serves to apply appropriate torque to the steering shaft in accordance with the state of the two-wheeled vehicle.

(7) In the steering control system of (6), the control device may calculate the output torque by adding or subtracting the assistive torque and the resistive torque.

(8) In the steering control system of (6) or (7), the output torque calculated by the control device may have a magnitude that does not eliminate a roll of the vehicle body. This serves to prevent the steering handle from automatically returning to the neutral position contrary to the intention of the driver when the two-wheeled vehicle is turning.

(9) In the steering control system according to any one of (1) to (8), the control device may calculate the assistive torque based on the roll angular velocity and a weight of the vehicle and/or a weight of a load on the vehicle.

(10) In the steering control system according to any one of (1) to (9), the control device may calculate the assistive torque based on the roll angular velocity and a vehicle speed.

(11) In the steering control system of (10), the assistive torque to be calculated by the control device may increase as the vehicle speed increases. This serves to effectively reduce the force required for the driver to operate the steering handle.

(12) In the steering control system according to any one of (1) to (11), the actuator may include a transmission mechanism that transmits torque to the steering shaft. The transmission mechanism may include a member that prevents transmission of the torque larger than a threshold value. This enables the driver of the two-wheeled vehicle to operate the steering handle against the torque transmitted to the steering shaft.

(13) In the steering control system of (12), the actuator may include an electric motor. An output shaft of the electric motor may be disposed away from the steering shaft. The transmission mechanism may include a belt as a member to prevent the transmission of the torque larger than a threshold value, where the belt transmits the torque of the output shaft of the electric motor to the steering shaft. This serves to prevent the torque larger than the threshold value from being transmitted to the steering shaft.

BRIEF DESCRIPTION OF THE DRAWINGS

FIG. 7 is a diagram illustrating an example of a map stored in a storage unit;

DETAILED DESCRIPTION OF THE INVENTION

Figure 1:
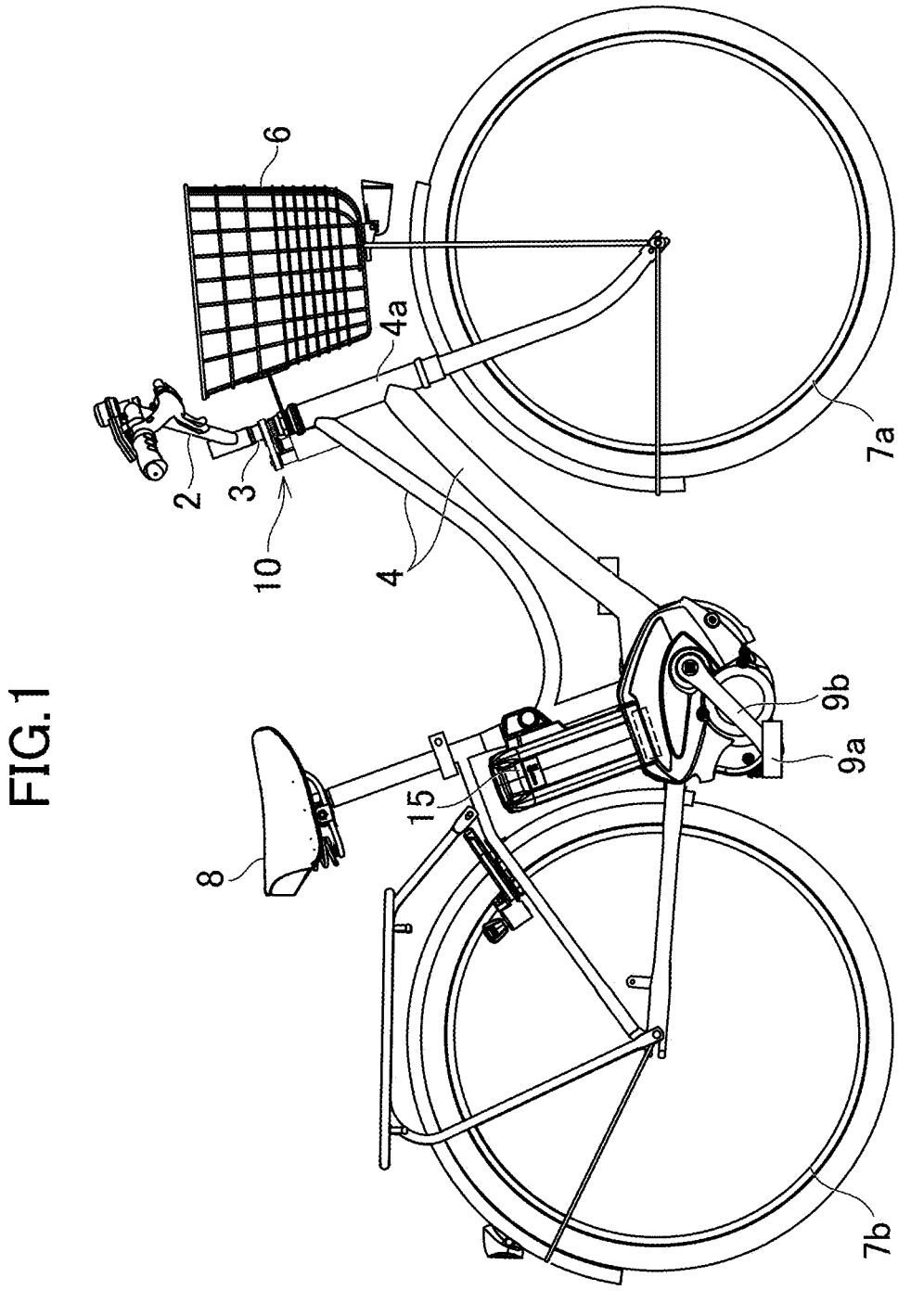
FIG. 1 is a side view of a two-wheeled vehicle including a steering control system proposed in the present disclosure.
Figure 2:
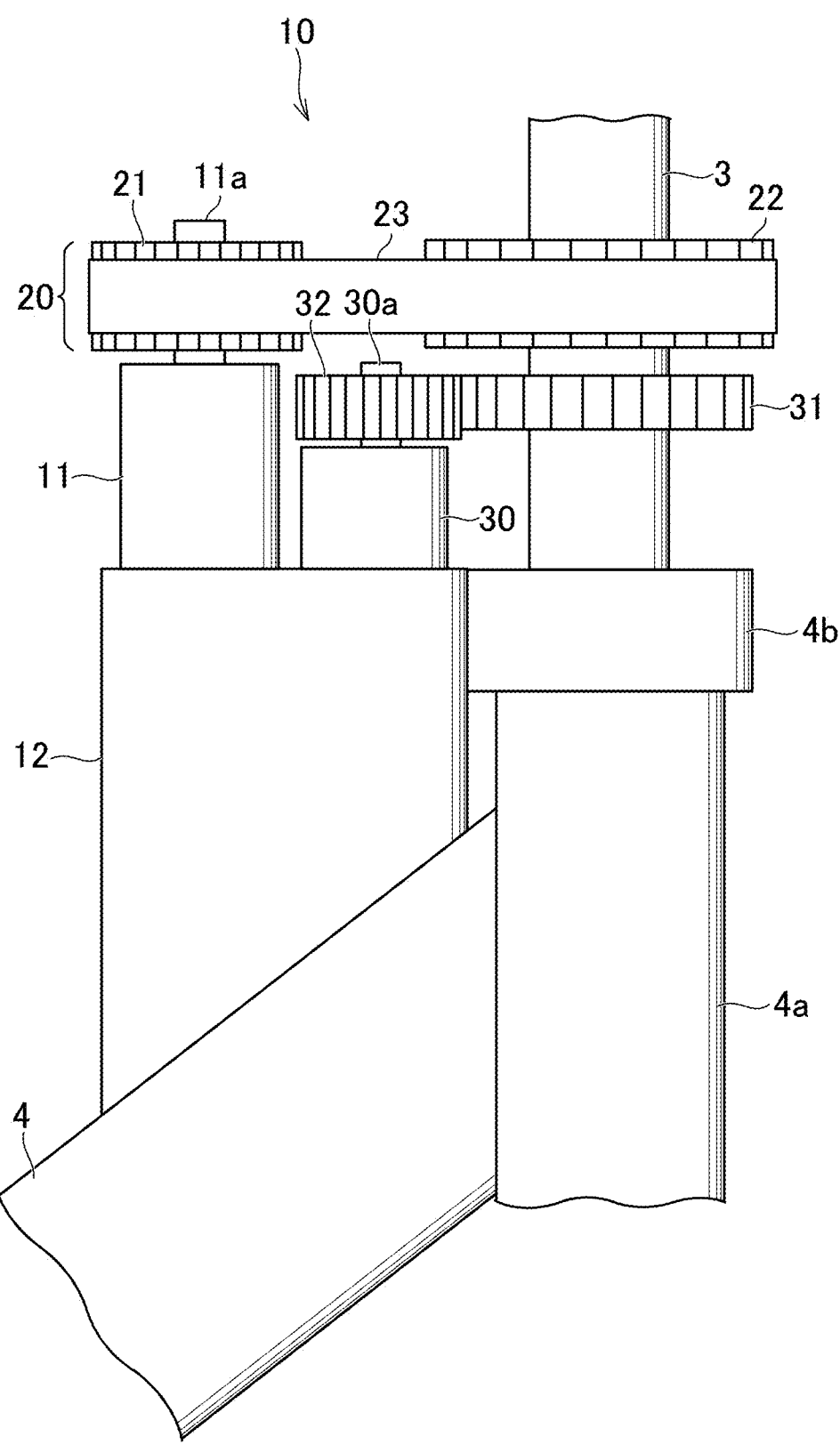
FIG. 2 is an enlarged view of the steering control system of FIG. 1.

In the following, embodiments of a steering control system of a two-wheeled vehicle proposed in the present disclosure will be described. FIG. 1 is a side view of a two-wheeled vehicle 1 including a steering control system 10, which is an example of the embodiment. FIG. 2 is an enlarged view of the steering control system 10 of FIG. 1. For example, the two-wheeled vehicle 1 may be an electric assisted bicycle having an assisting system for transmitting power of an electric motor to a wheel (e.g., rear wheel) to assist a driver in pedaling, or a bicycle that does not have such an assisting system. The two-wheeled vehicle 1 may be a motorcycle traveling by the power of a motor, such as a gasoline motor and an electric motor.

1. Outline of Two-Wheeled Vehicle

As shown in FIG. 1, the front portion of the two-wheeled vehicle 1 includes a steering handle 2 to be gripped by a driver, a rod-shaped steering shaft 3 to which the steering handle 2 is fixed, and a frame 4. The foremost portion of the frame 4 includes a head pipe 4a holding the steering shaft 3 so as to be rotatable. The two-wheeled vehicle 1 includes a front wheel 7a, a rear wheel 7b, and a saddle (seat) 8 on which the driver sits. When the two-wheeled vehicle 1 is a bicycle, the two-wheeled vehicle 1 may include a crankshaft 9b to which a pedal 9a and a pedal 9a are attached.

The steering shaft 3 may extend in a direction perpendicular to a direction in which the front wheel 7a and the rear wheel 7b of the two-wheeled vehicle 1 are arranged, or may be tilted in a direction of the front wheel 7a or the rear wheel 7b with respect to the perpendicular direction. The steering shaft 3 is rotatable in the right direction and the left direction from the neutral position in accordance with the operation of the steering handle 2 by the driver. The head pipe 4a accommodates the lower end portion of the steering shaft 3. The head pipe 4a has a fastener 4b at its upper end. The steering shaft 3 may be fixed in a vertical position with respect to the head pipe 4a by the fastener 4b and supported by the head pipe 4a.

In the example shown in FIG. 1, the two-wheeled vehicle 1 has a front basket 6 attached to the steering shaft 3. The front basket 6 can move in the left-right direction as the steering shaft 3 rotates. The two-wheeled vehicle 1 may have a child seat (not shown) attached to the steering handle 2 and/or the steering shaft 3 in addition to the front basket 6 or instead of the front base 6.

For example, in a case where the weight of the front basket 6 or the child seat is large or the two-wheeled vehicle 1 is traveling at a high speed, a large force is required to rotate the steering handle 2 at the start of the turning of the vehicle or to return the steering handle 2 to the neutral position at the end of the turning. Further, for example, when the driver quickly rotates the steering handle 2 in the left direction while the vehicle is turning to the right, it is preferable that the driver is able to perform the quick rotation in accordance with the intention of the driver. The two-wheeled vehicle 1 may include the steering control system 10 described below so as to assist a driver in operating the steering handle 2.

2. Outline of Steering Control System

As shown in FIG. 2, the steering control system 10 includes an electric motor 11 as a component of an actuator that applies torque to the steering shaft 3. The steering control system 10 may also include a transmission mechanism 20 that transmits torque from the electric motor 11 to the steering shaft 3 as an element of the actuator.

As shown in FIG. 2, the transmission mechanism 20 may include a first gear 21 fixed to an output shaft 11a of the electric motor 11 and a second gear 22 fixed to the steering shaft 3. The output shaft 11a of the electric motor 11 may extend in the same direction (vertical direction) as the steering shaft 3. The gears 21 and 22 may be arranged in the front-rear direction.

The transmission mechanism 20 may include a member that prevents transmission of torque greater than a threshold value. In the example shown in FIG. 2, the transmission mechanism 20 includes a belt 23 that transmits torque of the output shaft 11a of the electric motor 11 to the steering shaft 3 as a member that prevents transmission of torque larger than the threshold value. The belt 23 may be formed of rubber or resin, for example. The protrusions and the recesses that are formed on the inner surface of the belt 23 are engaged with recesses and protrusions of pulleys 21 and 22. The transmission mechanism 20 transmits the rotational force of the electric motor 11 to the steering shaft 3 through the pulleys 21 and 22 and the belt 23, thereby applying torque in the circumferential direction of the steering shaft 3 to the steering shaft 3. When torque greater than the threshold value is applied to the transmission mechanism 20, the protrusions and recesses of the belt 23 are disengaged from the recesses and the protrusions of the pulley 21 or the pulley 22 (e.g., the belt 23 slides with respect to the pulley 21 or the pulley 22). In this manner, it is possible to prevent the torque larger than the threshold value from being transmitted to the steering shaft 3. The driver of the two-wheeled vehicle 1 can operate the steering handle 2 against the torque transmitted to the steering shaft 3.

The steering control system 10 may include a steering sensor 30 that detects a rotation angle (steering angle) of the steering handle 2. The electric motor 11 and the steering sensor 30 may be positioned in a direction intersecting with the steering shaft 3. In the example shown in FIG. 2, the electric motor 11 and the steering sensor 30 are fixed to a support base 12 attached to the frame 4, and are disposed behind the steering shaft 3. The electric motor 11 and the steering sensor 30 are disposed on the support base 12 in the front-rear direction.

As shown in FIG. 2, the first gear 31 may be fixed to the steering shaft 3 at a position different from the second pulley 22. The steering sensor 30 may have a detection shaft 30a extending in the same direction as the steering shaft 3 (vertical direction in FIG. 2), and the second gear 32 may be fixed to the detection shaft 30a. The gears 31 and 32 may be arranged in the front-rear direction, and the teeth of the gears 31 and 32 may be directly engaged with each other. The steering shaft 3 rotates, and the detection shaft 30a thereby rotates at an angle corresponding to the gear ratio of the gears 31 and 32. This enables the steering sensor 30 to detect the rotation angle of the steering shaft 3 in the circumferential direction. That is, the steering sensor 30 can detect the rotation angle of the steering handle 2.

Figure 3:
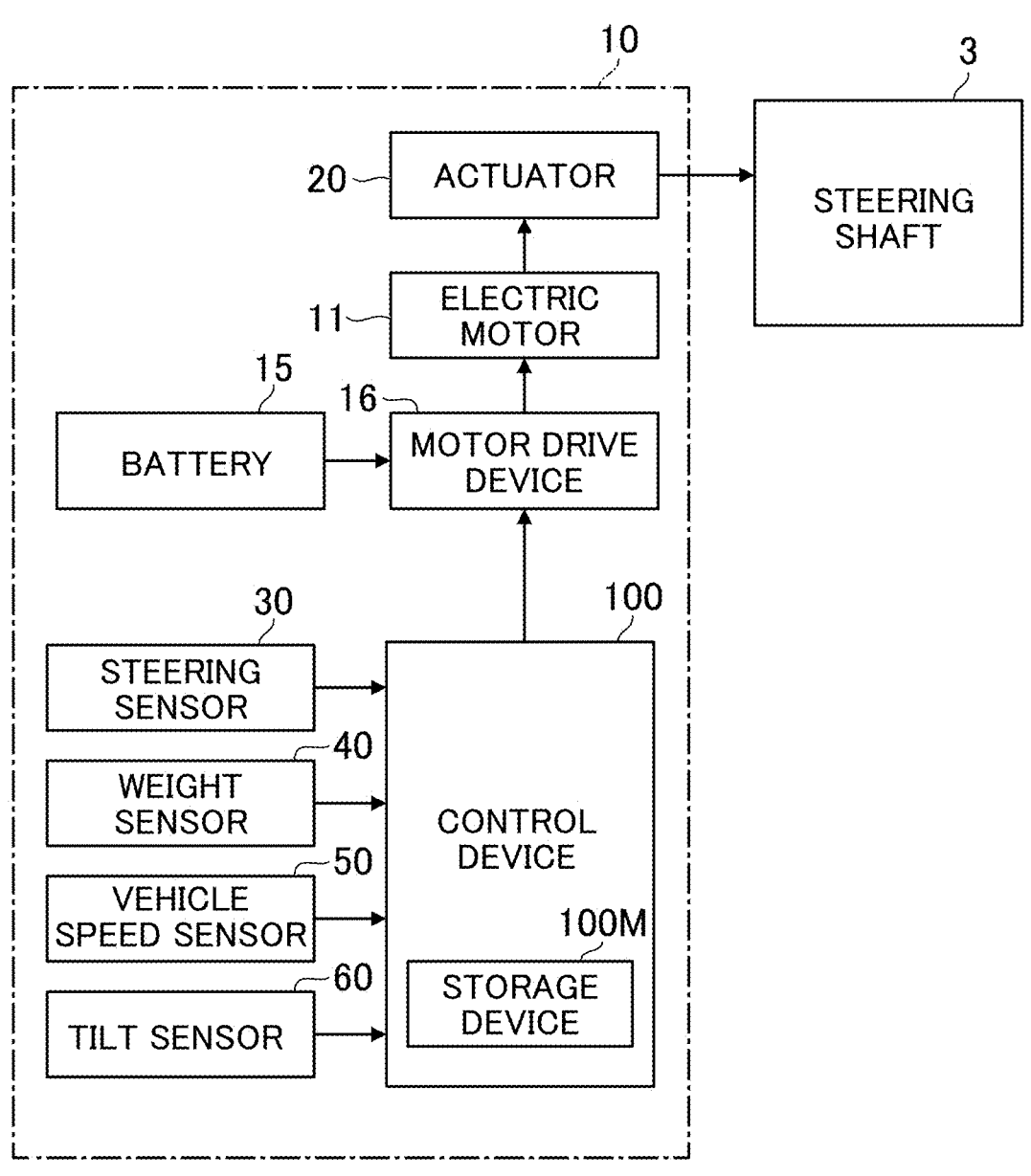
FIG. 3 is a block diagram showing hardware of the steering control system.

FIG. 3 is a block diagram showing the hardware of the steering control system 10. The steering control system 10 may include a battery 15, a motor drive device 16, a weight sensor 40, a vehicle speed sensor 50, a tilt sensor 60, and a control device 100 in addition to the electric motor 11, the transmission mechanism 20, and the steering sensor 30 shown in FIG. 2. The steering control system 10 may include a pedaling force sensor that detects a pedaling force applied to the pedal 9a by the driver.

The control device 100 includes an arithmetic device, such as a CPU (central processing unit), and a storage device 100M storing a program and a map for executing an arithmetic process in the arithmetic device. The storage device 100M may be a storage medium such as RAM (random access memory) or ROM (read only memory).

The battery 15 supplies electric power to the motor drive device 16. The battery 15 may supply power to a device or a component (e.g., control device 100) different from the motor drive device 16. The motor drive device 16 receives the electric power of the battery 15 and supplies the electric power corresponding to assistive torque described later determined by the control device 100 to the electric motor 11. As will be described later, the control device 100 determines the assistive torque for applying appropriate torque to the steering shaft 3 from the electric motor 11 based on the values detected by the steering sensor 30, the weight sensor 40, the vehicle speed sensor 50, and the tilt sensor 60.

As described above, the steering sensor 30 detects the rotation angle of the steering handle 2. The weight sensor 40 detects the weight of the two-wheeled vehicle 1. The weight sensor 40 may detect the weight of the load on the two-wheeled vehicle 1. The weight sensor 40 may detect the weight of a load or a person on the front basket 6 or the child seat of the two-wheeled vehicle 1, for example.

The vehicle speed sensor 50 detects a speed (vehicle speed) of the two-wheeled vehicle 1 in a traveling direction (e.g., forward direction). The tilt sensor 60 detects a roll angle and a roll angular velocity of the body of the two-wheeled vehicle 1. The roll angle of the body of the two-wheeled vehicle 1 is an angle in the circumferential direction around the axis along the front-rear direction of the vehicle body, and is a tilt angle of the vehicle body in the left direction or the right direction. The roll angular velocity of the body of the two-wheeled vehicle 1 is a displacement amount of the roll angle in a unit time.

The vehicle speed sensor 50 may be a magnetic rotation sensor mounted on the front wheel 7a or the rear wheel 7b, for example. In this case, the vehicle speed sensor 50 outputs a pulse signal when a magnet attached to a part of the outer peripheral edge of the front wheel 7a or the rear wheel 7b arrive at the sensor. The tilt sensor 60 may be an inertial measurement unit (IMU) attached to the frame 4 of the vehicle body, for example.

3. Details of Roll Angle and Roll Angular Velocity

Figure 4:
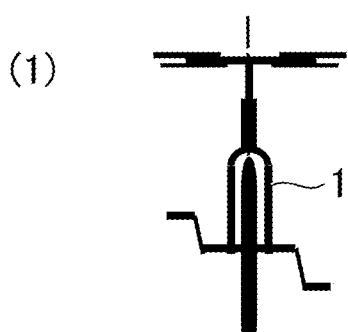
FIG. 4 is a diagram illustrating an example of a change in a roll angle and a roll angular velocity during an operation of a two-wheeled vehicle.
Figure 4:
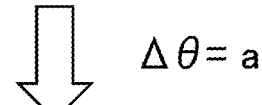
Figure 4:
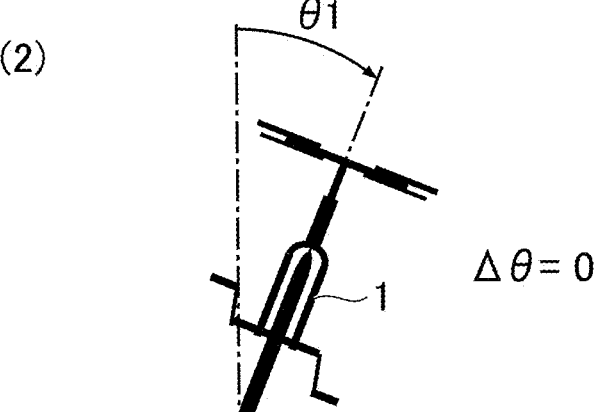
Figure 4:
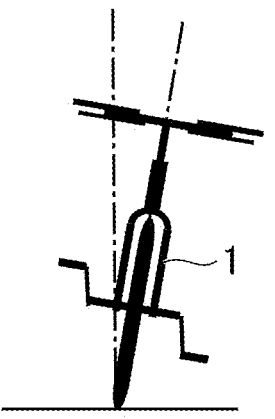

FIG. 4 is a diagram showing an example of a roll angle and a roll angular velocity when the two-wheeled vehicle 1 is operated. In FIG. 4, (1) shows the two-wheeled vehicle traveling straight, (2) shows the two-wheeled vehicle 1 turning rightward from the state in (1), and (3) shows the two-wheeled vehicle 1 returning to the state of traveling straight from the state in (2).

In (1) of FIG. 4, the two-wheeled vehicle 1 travels straight and is in a vertical posture (neutral posture) in which the vehicle body is not tilted in the left-right direction. In this case, the roll angle $\theta$ and the roll angular velocity $\Delta\theta$ of the vehicle body may be 0. In the following, the roll angle when the vehicle body is tilted to the right is indicated by a positive value, and the roll angle when the vehicle body is tilted to the left is indicated by a negative value. Further, the roll angular velocity when the vehicle body tilts in the right direction is indicated by a positive value, and the roll angular velocity when the vehicle body tilts in the left direction is indicated by a negative value.

When the two-wheeled vehicle 1 turns to the right as shown in (2) of FIG. 4, the vehicle body tilts to the right. The roll angle $\theta$ of the vehicle body in this case may be $\theta1$ ($\theta1>0$). As shown in (3) of FIG. 4, when the two-wheeled vehicle 1 returns to the state of traveling straight from the state of turning to the right, the tilt angle of the vehicle body in the right direction is shallower than the state of (2). In this regard, the roll angle $\theta$ of the vehicle body may be $\theta2$ ($0<\theta2<\theta1$).

As shown in (1) and (2) of FIG. 4, the roll angular velocity $\Delta\theta$ when the vehicle body tilts in the right direction may be a ($a>0$). As shown in (2) of FIG. 4, when the vehicle body is tilted to the right and further tilting in the left direction or the right direction does not occur (i.e., while the two-wheeled vehicle 1 continues turning to the right), the roll angular velocity $\Delta\theta$ may be 0. Further, as shown in (2) and (3) of FIG. 4, when the two-wheeled vehicle 1 returns to a state of traveling straight from the state of turning to the right, the roll angular velocity $\Delta\theta$ may be $-b$ ($-b<0$).

The inventors of the present invention measured the roll angular velocity and the load torque while the two-wheeled vehicle was traveling, and found that there is a high correlation between them. The measured "load torque" is generated in the steering shaft 3 when the driver operates the steering handle 2 of the two-wheeled vehicle 1 that does not include the steering control system 10. For example, the load torque is detected by a torque sensor mounted on or around the steering shaft 3.

Figure 5A:
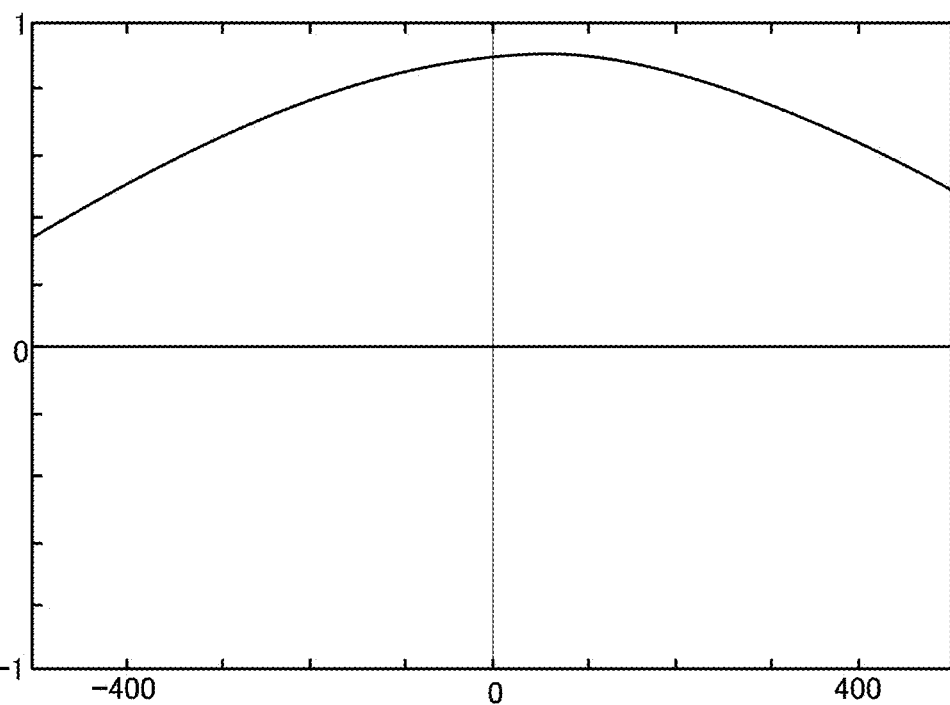
FIG. 5A is a graph showing correlation between the roll angular velocity and the load torque.

FIG. 5A shows a graph indicating the correlation between the measured roll angular velocity and the load torque. In FIG. 5A, the vertical axis represents the correlation coefficient between the roll angular velocity and the load torque, and the horizontal axis represents the time difference between the time at which the roll angular velocity is detected and the time at which the load torque is detected. For example, the correlation coefficient at the time difference of 0 (value of the horizontal axis is 0) is between the roll angular velocity and the load torque that are detected at the same time. The correlation coefficient at the time difference of −100 milliseconds (value of the horizontal axis is −100) is between the roll angular velocity that is detected 100 milliseconds later when the load torque is detected. The correlation coefficient at the time difference of +100 milliseconds (value of the horizontal axis is +100) is between the roll angular velocity detected 100 milliseconds before when the load torque is detected.

According to such measurement, as shown in FIG. 5A, the correlation coefficient between the roll angular velocity and the load torque is substantially "1" when the time difference between the time at which the roll angular velocity is detected and the time at which the load torque is detected is 0. This shows that the roll angular velocity substantially indicates the load torque. That is, it can be said that the change in the roll angular velocity and the magnitude thereof substantially indicate the change and the magnitude of the load torque.

In view of the above, as will be described later, the steering control system 10 applies torque corresponding to the roll angular velocity and directed in a direction corresponding to the roll angular velocity to the steering shaft 3. As shown in FIG. 5A, the timing to change the load torque substantially coincides with the timing to change the roll angular velocity. As such, the steering control system 10 enables the application of torque for reducing or canceling the load torque to the steering shaft 3 at the time when the load torque increases (when the driver applies torque to the steering handle 2).

The inventors of the present invention measured the roll angle and the load torque while the two-wheeled vehicle was traveling, and found that the correlation between the roll angle and the load torque was lower than the correlation between the roll angular velocity and the load torque.

Figure 5B:
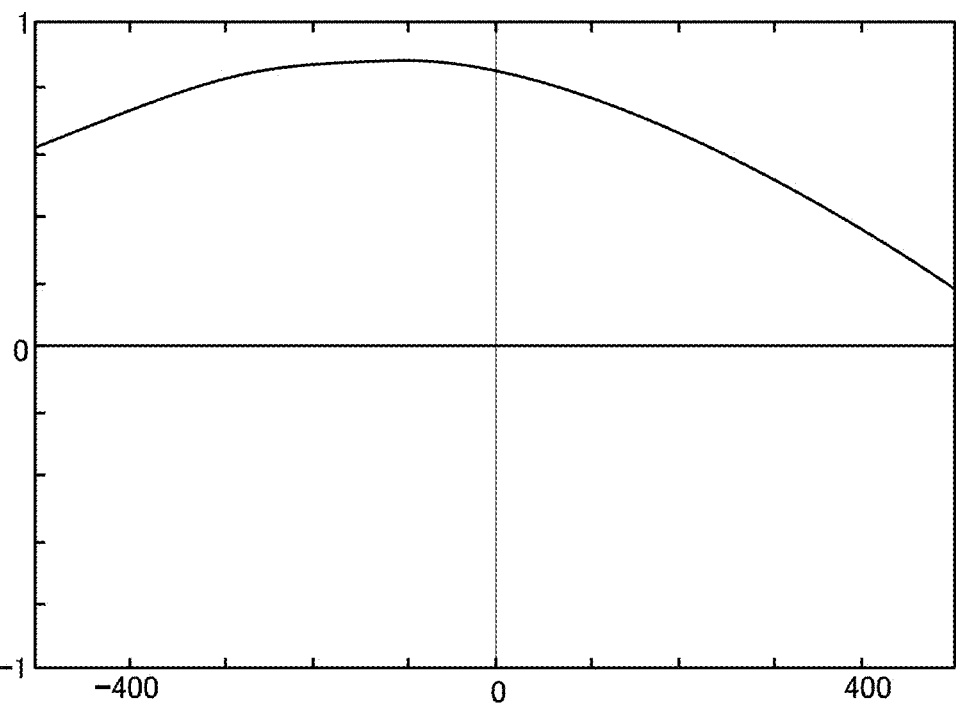
FIG. 5B is a graph showing the correlation between the roll angle and the load torque.

FIG. 5B shows the correlation between the measured roll angle and the load torque. In FIG. 5B, the vertical axis represents the correlation coefficient between the roll angle and the load torque, and the horizontal axis represents the time difference between the time at which the roll angle is detected and the time at which the load torque is detected. In FIG. 5B, for example, the correlation coefficient at the time difference of 0 (value of the horizontal axis is 0) is between the roll angle and the load torque that are detected at the same time. The correlation coefficient at the time difference of −100 milliseconds (value of the horizontal axis is −100) is between the roll angle that is detected 100 milliseconds later when the load torque is detected. The correlation coefficient at the time difference of +100 milliseconds (value of the horizontal axis is +100) is between the roll angle that is detected 100 milliseconds before when the load torque is detected.

As shown in FIG. 5B, the correlation between the roll angular velocity and the load torque is closest to "1" when the time difference between the time at which the roll angular velocity is detected and the time at which the load torque is detected is −100 to −200. This indicates that the change in the roll angle occurs slightly later than the change in the load torque.

4. Functions of Control Device

Figure 6:
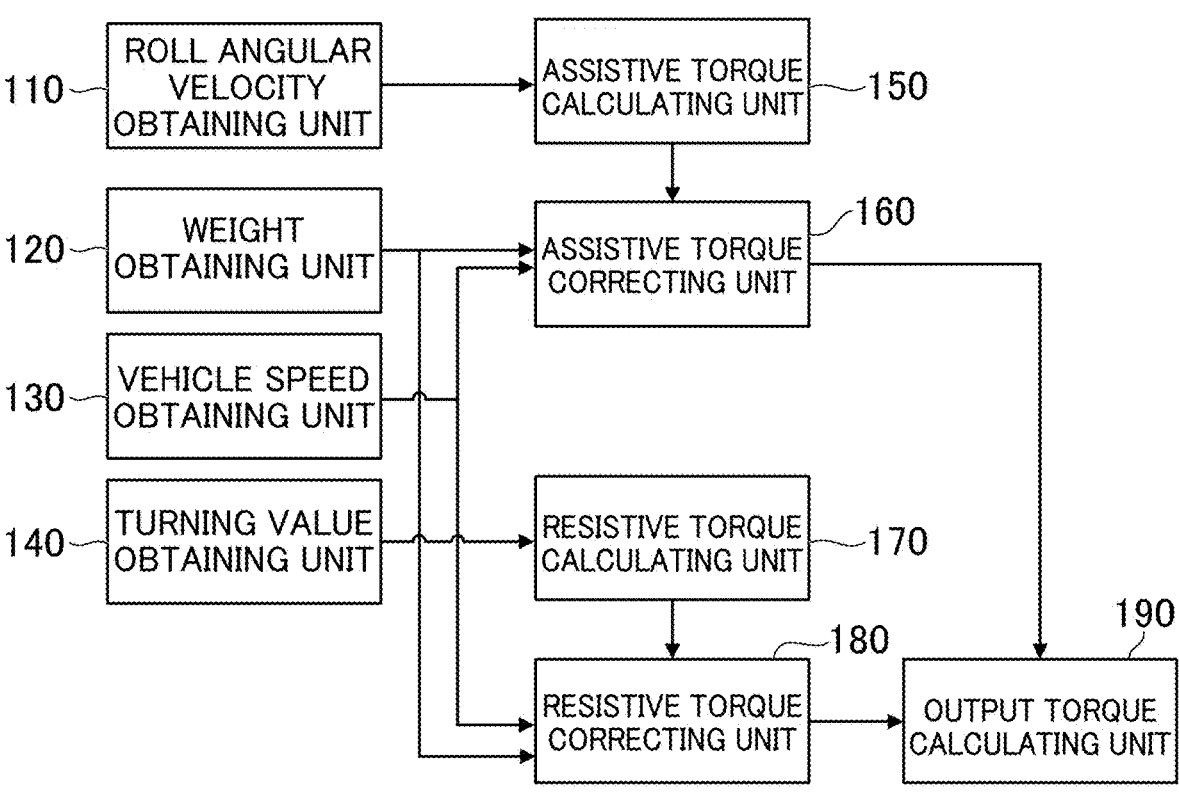
FIG. 6 is a functional block diagram showing functions of a control device of the two-wheeled vehicle.

FIG. 6 is a functional block diagram showing the functions of the control device 100 of the steering control system 10. As shown in FIG. 6, the control device 100 may functionally include a roll angular velocity obtaining unit 110, a weight obtaining unit 120, a vehicle speed obtaining unit 130, a turning value obtaining unit 140, an assistive torque calculating unit 150, an assistive torque correcting unit 160, a resistive torque calculating unit 170, a resistive torque correcting unit 180, and an output torque calculating unit 190.

The roll angular velocity obtaining unit 110 obtains the roll angular velocity of the two-wheeled vehicle 1 detected by the tilt sensor 60. The vehicle speed obtaining unit 130 obtains the vehicle speed detected by the vehicle speed sensor 50.

The weight obtaining unit 120 may obtain the weight of the two-wheeled vehicle 1 detected by the weight sensor 40 and/or the weight of the load on the two-wheeled vehicle 1 (e.g., weight of the load in the front basket 6 or the child on the child seat). The weight obtaining unit 120 may subtract the weight of the two-wheeled vehicle 1 without the load from the current weight of the two-wheeled vehicle 1 detected by the weight sensor 40, thereby obtaining the weight of the load on the two-wheeled vehicle 1. The weight obtaining unit 120 may calculate the weight of the two-wheeled vehicle 1 based on the ratio of the pedaling force on the pedal 9a to the acceleration of the two-wheeled vehicle 1. In this case, the two-wheeled vehicle 1 may not include the weight sensor 40.

The turning value obtaining unit 140 obtains a turning value of the two-wheeled vehicle 1. The turning value indicates a degree of turning of the two-wheeled vehicle 1, and specifically, is a rotation angle of the steering shaft 3 or a roll angle of the vehicle body. The turning value obtaining unit 140 obtains the rotation angle of the steering handle 2 detected by the steering sensor 30 as a vehicle turning value, for example. The turning value obtaining unit 140 may obtain the roll angle of the two-wheeled vehicle 1 detected by the tilt sensor 60 as a turning value. In this case, the steering control system 10 may not include the steering sensor 30 and the gears 31 and 32 shown in FIG. 2.

4-1. Calculation of Assistive Torque

The assistive torque calculating unit 150 calculates assistive torque having a magnitude corresponding to the roll angular velocity obtained by the roll angular velocity obtaining unit 110. As described above, the timing to change the load torque and the magnitude of the load torque substantially coincides with the timing to change the roll angular velocity and the magnitude of the roll angular velocity. As such, the assistive torque having the magnitude corresponding to the roll angular velocity is calculated and output to the steering shaft 3, and whereby the torque that reduces or cancels the load torque can be applied to the steering shaft 3 at the time when the load torque increases.

The assistive torque calculating unit 150 may calculate the assistive torque based on the map stored in the storage device 100M. Further, the assistive torque calculating unit 150 may calculate the assistive torque based on a predetermined calculation formula.

Figure 7:
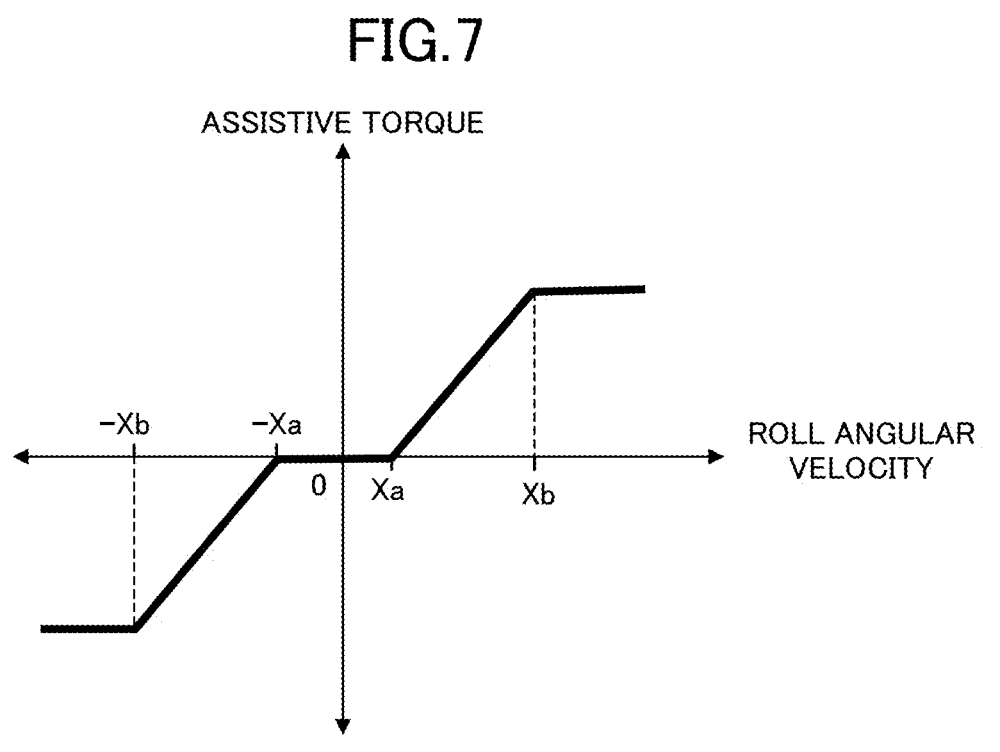

FIG. 7 is a diagram illustrating an example of a map stored in the storage device 100M. In the map shown in FIG. 7, the horizontal axis represents the roll angular velocity, the positive value of the horizontal axis represents the roll angular velocity in the right direction, and the negative value represents the roll angular velocity in the left direction. In the map shown in FIG. 7, the vertical axis represents the assistive torque, the positive value of the vertical axis represents the assistive torque in the right rotation, and the negative value of the vertical axis represents the assistive torque in the left rotation. The assistive torque calculating unit 150 may refer to the map shown in FIG. 7 to calculate the assistive torque corresponding to the roll angular velocity obtained by the roll angular velocity obtaining unit 110.

The assistive torque calculating unit 150 calculates an assistive torque directed in a direction corresponding to the roll angular velocity of the two-wheeled vehicle 1. For example, when the tilt sensor 60 detects the roll angular velocity in the right direction (when the roll angle changes in the right direction), the assistive torque calculating unit 150 calculates the assistive torque in the direction in which the steering shaft 3 is rotated to the right. For example, as shown in (1) and (2) of FIG. 4, when the roll angular velocity $\Delta\theta$ is a positive value and indicates a change of the roll angle in the right direction, the assistive torque calculating unit 150 calculates the assistive torque for applying the force of the right rotation to the steering shaft 3.

In contrast, when the tilt sensor 60 detects the roll angular velocity in the left direction (when the roll angle changes in the left direction), the assistive torque calculating unit 150 calculates the assistive torque in the direction in which the steering shaft 3 is rotated to the left. For example, as shown in (2) and (3) of FIG. 4, when the roll angular velocity AO is a negative value and indicates a change of the roll angle in the left direction, the assistive torque calculating unit 150 calculates the assistive torque for applying the force of the left rotation to the steering shaft 3.

When a roll angular velocity in the left direction is detected while the vehicle body is tilted to the right from the vertical posture, the assistive torque calculating unit 150 calculates the assistive torque in the direction to rotate the steering shaft 3 in the left direction. Further, when the roll angular velocity in the right direction is detected while the vehicle body is tilted to the left from the vertical posture, the assistive torque calculating unit 150 calculates the assistive torque in the direction to rotate the steering shaft 3 in the right direction. For example, as shown in (2) and (3) of FIG. 4, when the roll angular velocity $\Delta\theta$ in the left direction is detected while the vehicle body is tilted to the right, the assistive torque calculating unit 150 calculates the assistive torque in the direction to rotate the steering shaft 3 in the left direction.

When the absolute value of the roll angular velocity is within a range larger than a predetermined value (e.g., 0) (within the range of +xa to xb and xa to −xb in FIG. 7), the map shown in FIG. 7 is designed such that the assistive torque calculated by the assistive torque calculating unit 150 (the absolute value of the assistive torque) increases as the roll angular velocity (the absolute value of the roll angular velocity) increases. For example, the assistive torque calculated when the roll angular velocity increases in the positive direction (right direction in FIG. 7) increases in the positive direction (upper direction in FIG. 7), that is, in the direction in the right rotation. Similarly, the assistive torque calculated when the roll angular velocity increases in the negative direction (left direction in FIG. 7) increases in the negative direction (downward direction in FIG. 7), that is, in the direction in the leftward rotation. In this manner, for example, when the two-wheeled vehicle 1 in the vertical posture is tilted to turn and the roll angular velocity obtaining unit 110 obtains a large roll angular velocity, large assistive torque can be applied to the steering shaft 3. That is, large assistive torque can be applied to the steering shaft 3 at the time when the steering handle 2 needs to be operated. This effectively reduces the force required for the driver to operate the steering handle 2.

As shown in the map shown in FIG. 7, when the roll angular velocity exceeds the threshold value (+xb or −xb in FIG. 7), the amount of increase in the assistive torque (the absolute value of the assistive torque) associated with the increase in the roll angular velocity (the absolute value of the roll angular velocity) may be smaller than in the case where the roll angular velocity is smaller than the threshold value. This can prevent excessive assistive torque from being applied to the steering shaft 3. As shown in FIG. 7, when the roll angular velocity exceeds the threshold value (xb or −xb in FIG. 7), the assistive torque (absolute value of the assistive torque) may be constant regardless of the increase in the roll angular velocity (absolute value of the roll angular velocity).

The map shown in FIG. 7 is designed such that the assistive torque calculated by the assistive torque calculating unit 150 is substantially 0 when the roll angular velocity is within the range including 0 (within the range of −xa to +xa in FIG. 7), that is, when the absolute value of the roll angular velocity is lower than the threshold value (xa). In this manner, a so-called dead zone is provided, which can prevent the assistive torque from being applied to the steering shaft 3 due to a minute change in the roll angular velocity.

When the size and the weight of the vehicle body are fixed, the rotation angle (self-steering angle) of the steering handle where the posture of the vehicle is stabilized when the two-wheeled vehicle turns is uniquely determined by the roll angle of the vehicle body. As such, when the roll angle changes, the self-steering angle also changes. For example, the assistive torque defined in FIG. 7 is required to achieve the amount of change in the self-steering angle necessary to change the roll angle per unit time (i.e., roll angular velocity). Accordingly, when such assistive torque is applied from the actuator (electric motor 11 and transmission mechanism 20) to the steering shaft 3, stable turning (turning while maintaining the self-steering angle) can be provided while reducing the force required when the driver operates the steering handle 2.

The control device 100 may calculate the assistive torque based on a roll angular velocity obtained by the roll angular velocity obtaining unit 110 and a parameter different from such a roll angular velocity. For example, the assistive torque correcting unit 160 shown in FIG. 6 may correct the assistive torque calculated by the assistive torque calculating unit 150 based on a value different from the roll angular velocity obtained by the roll angular velocity obtaining unit 110.

The value different from the roll angular velocity may be the weight of the two-wheeled vehicle 1 or the weight of the load on the two-wheeled vehicle 1. The control device 100 may calculate the assistive torque based on the roll angular velocity and the weight of the two-wheeled vehicle 1 and/or the weight of the load on the two-wheeled vehicle 1, for example. In this case, the assistive torque correcting unit 160 may correct the assistive torque calculated by the assistive torque calculating unit 150 based on the weight (of the two-wheeled vehicle 1 and/or of the load on the two-wheeled vehicle 1).

When the vehicle or the load on the vehicle is heavy, a large force is required to operate the steering handle 2. As such, the assistive torque calculated by the assistive torque calculating unit 150 (assistive torque corrected by assistive torque correcting unit 160) may increase as the weight of the two-wheeled vehicle 1 or the weight of the load on the two-wheeled vehicle 1 increases. This more effectively reduces the force required for the driver to operate the steering handle 2.

The value different from the roll angular velocity may be the vehicle speed. The control device 100 may calculate the assistive torque based on the roll angular velocity obtained by the roll angular velocity obtaining unit 110 and the vehicle speed obtained by the vehicle speed obtaining unit 130, for example. In this case, the assistive torque correcting unit 160 may correct the assistive torque calculated by the assistive torque calculating unit 150 based on the vehicle speed.

Figure 8:
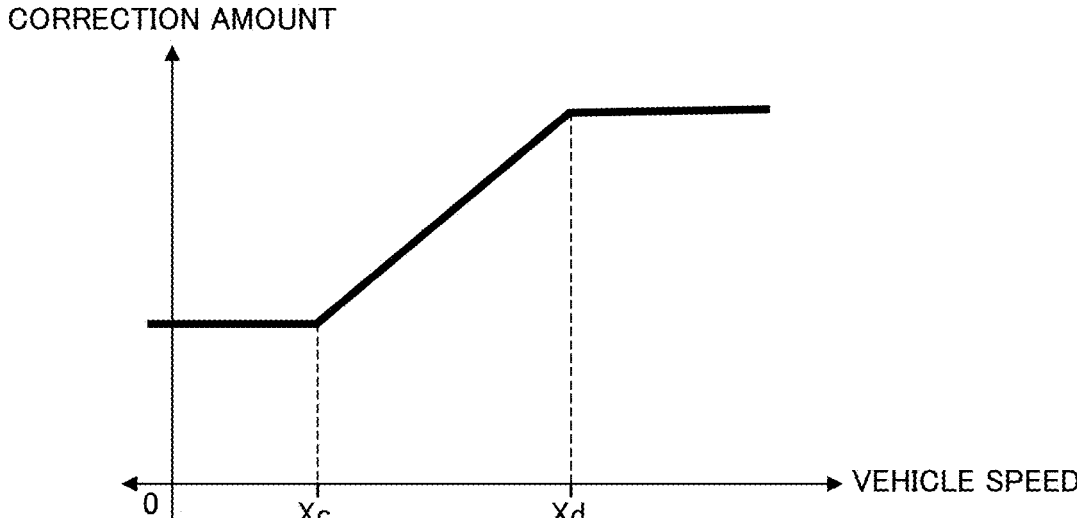
FIG. 8 is a diagram illustrating an example of a map stored in the storage unit.

FIG. 8 is a diagram illustrating an example of a map stored in the storage device 100M. In the map shown in FIG. 8, the horizontal axis represents the vehicle speed and the vertical axis represents the correction amount. The assistive torque correcting unit 160 may refer to the map shown in FIG. 8 to calculate the correction amount of the assistive torque corresponding to the vehicle speed obtained by the vehicle speed obtaining unit 130.

The correction amount shown in FIG. 8 may be a ratio of the assistive torque before the correction to the assistive torque after the correction, for example. That is, the assistive torque correcting unit 160 may multiply the assistive torque calculated by the assistive torque calculating unit 150 by the correction amount (ratio) obtained in FIG. 8. Alternatively, the storage device 100M may store a map indicating a correction amount added to (or subtracted from) the assistive torque calculated by the assistive torque calculating unit 150.

When the two-wheeled vehicle 1 is traveling at a high speed, the traveling direction of the two-wheeled vehicle 1 is kept constant by the gyro effect. In this case, a large force is required to operate the steering handle 2 in order to change the traveling direction of the two-wheeled vehicle 1. As such, the assistive torque calculated by the control device 100 may increase as the vehicle speed increases. The map shown in FIG. 8 is designed such that the correction amount of the assistive torque increases as the vehicle speed increases when the vehicle speed is within a predetermined range (within the range of xc to xd of FIG. 8). This more effectively reduces the force required for the driver to operate the steering handle 2.

When the vehicle speed exceeds the predetermined threshold value (xd in FIG. 8), the correction amount of the assistive torque may be constant regardless of the increase in the vehicle speed. When the vehicle speed is lower than the predetermined threshold (xc in FIG. 8) or when the pedaling force is not applied to the pedal 9a, the assistive torque calculated by the control device 100 may be set to 0.

The control device 100 may calculate the assistive torque based on the shape of the two-wheeled vehicle 1, for example. The two-wheeled vehicle 1 may have a weight sensor 40 for detecting the weight of the front side (e.g., the weight of the front basket 6 or the child seat) and a weight sensor for detecting the weight of the rear side (e.g., the weight of the rear basket attached behind the saddle 8). In this case, the control device 100 may calculate the assistive torque based on the weights detected by the two weight sensors.

In the example described with reference to FIG. 6, the assistive torque correcting unit 160 corrects the assistive torque calculated by the assistive torque calculating unit 150. However, the process for calculating the assistive torque is not limited to this example.

For example, the assistive torque calculating unit 150 may directly calculate the assistive torque based on the roll angular velocity and the vehicle speed. In this case, the assistive torque calculating unit 150 may use a three-dimensional or more map (map associating the roll angular velocity, the vehicle speed, and the assistive torque) stored in the storage device 100M. Similarly, the assistive torque calculating unit 150 may directly calculate the assistive torque based on the roll angular velocity and the weight. In this case, the assistive torque calculating unit 150 may use a three-dimensional or more map (a map associating the roll angular velocity, the weight, and the assistive torque) stored in the storage device 100M. In this manner, the assistive torque calculating unit 150 may directly calculate the assistive torque based on a parameter different from the roll angular velocity (e.g., vehicle speed, weight).

4-2. Calculation of Resistive Torque

The resistive torque calculating unit 170 calculates resistive torque directed to a direction opposite to the direction in which the steering shaft 3 rotates from the neutral position. The resistive torque calculated by the resistive torque calculating unit 170 has a magnitude corresponding to the vehicle turning value obtained by the turning value obtaining unit 140. As described above, the vehicle turning value may be a roll angle of the two-wheeled vehicle 1 or a rotation angle of the steering shaft 3. In this way, it is possible to apply the resistive torque to the steering shaft 3 so that the rotation angle of the steering shaft 3 does not increase. Further, the resistive torque corresponding to the vehicle turning value can be applied to the steering shaft 3 without limiting the range of the angular velocity and the range of the angular position of the steering shaft 3. For example, the driver can quickly rotate the steering shaft 3 to the left while the vehicle is turning to the right.

Similarly to the assistive torque calculating unit 150, the resistive torque calculating unit 170 may calculate the resistive torque based on the map stored in the storage device 100M. The resistive torque calculating unit 170 may calculate the resistive torque based on a predetermined calculation formula.

Figure 9:
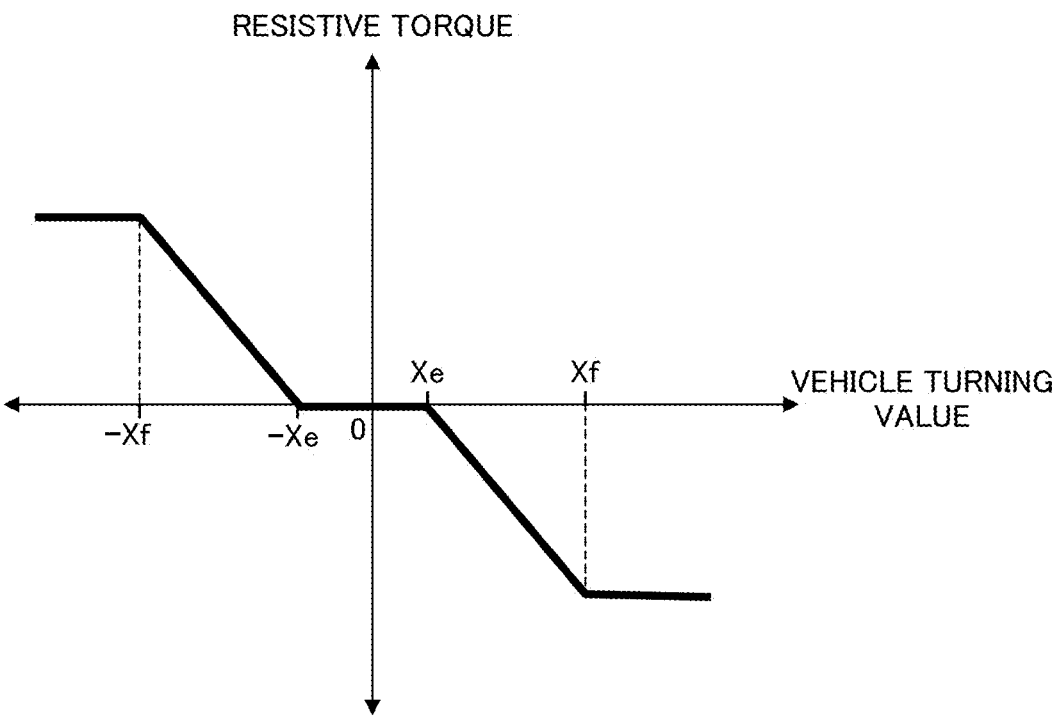
FIG. 9 is a diagram illustrating an example of a map stored in the storage unit.

FIG. 9 is a diagram illustrating an example of a map stored in the storage device 100M. In the map shown in FIG. 9, the horizontal axis represents the vehicle turning value. A positive value of the horizontal axis indicates a vehicle turning value indicating a turning in the right direction (a roll angle of the two-wheeled vehicle 1 in the right direction or a rotation angle of the steering shaft 3), and a negative value of the horizontal axis indicates a vehicle turning value indicating a turning in the left direction. In the map shown in FIG. 9, the vertical axis represents the resistive torque. The positive value of the vertical axis indicates the resistive torque in the direction of rotating the steering shaft 3 to the right, and the negative value of the vertical axis indicates the resistive torque in the direction of rotating the steering shaft 3 to the left. The resistive torque calculating unit 170 may refer to the map shown in FIG. 9 to calculate the resistive torque corresponding to the vehicle turning value obtained by the turning value obtaining unit 140.

The resistive torque calculating unit 170 calculates resistive torque directed in a direction opposite to the direction indicated by the vehicle turning value obtained by the turning value obtaining unit 140. For example, when the two-wheeled vehicle 1 is tilted to the right, that is, when the steering shaft 3 is rotated to the right from the neutral position, the resistive torque calculating unit 170 calculates resistive torque in a direction in which the steering shaft 3 is rotated to the left. In contrast, when the two-wheeled vehicle 1 is tilted to the left, that is, when the steering shaft 3 is rotated to the left from the neutral position, the resistive torque calculating unit 170 calculates the resistive torque in a direction in which the steering shaft 3 is rotated to the right.

In a range in which the absolute value of the vehicle turning value is larger than 0 (in the example of FIG. 9, within the range of +xe to +xf and −xe to −xf), the map shown in FIG. 9 is designed such that the resistive torque calculated by the resistive torque calculating unit 170 (the absolute value of the resistive torque) increases as the vehicle turning value (the absolute value of the vehicle turning value) increases. For example, as the vehicle turning value increases in the positive direction, the resistive torque increases in the negative direction (downward direction in FIG. 9), that is, in the direction of the left rotation. In other words, the resistive torque increases in the direction of the left rotation as the roll angle increases in the right direction or as the steering shaft increases in the direction of the right rotation. In contrast, as the vehicle turning value increases in the negative direction, the resistive torque increases in the positive direction (upward direction in FIG. 9), that is, in the direction of the right rotation. That is, the resistive torque increases in the direction of the right rotation as the roll angle increases in the left direction or as the steering shaft increases in the direction of the left rotation. This allows the driver to rotate the steering shaft 3 to the left more quickly when, for example, the vehicle is largely tilted to the right or the steering handle 2 is largely rotated in the direction of the right rotation from the neutral position.

The map shown in FIG. 9 is designed such that, when the vehicle turning value exceeds the threshold value (+xf or −xf in FIG. 9), the increase in the resistive torque associated with the increase in the vehicle turning value is smaller as compared with the case where the vehicle turning value is smaller than the threshold value. In this manner, it is possible to prevent excessive resistive torque from being applied to the steering shaft 3. As shown in FIG. 9, in the range where the vehicle turning value exceeds the threshold value (xf or −xf in FIG. 9), the resistive torque may be constant regardless of the increase in the vehicle turning value.

The map shown in FIG. 9 is designed such that the resistive torque is substantially 0 when the vehicle turning value is within a range including 0 (within the range of −xe to +xe of FIG. 9), that is, when the absolute value of the vehicle turning value is lower than the threshold value (xe). The dead zone is provided in this manner, thereby preventing the resistive torque from being applied to the steering shaft 3 due to a minute change in the vehicle turning value.

The control device 100 may calculate the resistive torque based on the vehicle turning value obtained by the turning value obtaining unit 140 and a parameter different from the vehicle turning value. For example, the resistive torque correcting unit 180 shown in FIG. 6 may correct the assistive torque calculated by the resistive torque calculating unit 170 based on a value different from the vehicle turning value.

The value different from the vehicle turning value may be the weight of the two-wheeled vehicle 1 or the weight of the load on the two-wheeled vehicle 1, for example. The control device 100 may calculate the resistive torque based on the vehicle turning value and the weight of the two-wheeled vehicle 1 and/or the weight of the load on the two-wheeled vehicle 1, for example. In this case, the resistive torque correcting unit 180 may correct the resistive torque calculated by the resistive torque calculating unit 170 based on the weight (weight of the two-wheeled vehicle 1 and/or weight of the load on the two-wheeled vehicle 1). This more effectively reduces the force required for the driver to operate the steering handle 2.

The value different from the vehicle turning value may be a vehicle speed, for example. For example, the control device 100 may calculate the resistive torque based on the vehicle turning value and the vehicle speed obtained by the vehicle speed obtaining unit 130. In this case, the resistive torque correcting unit 180 may correct the resistive torque calculated by the resistive torque calculating unit 170 based on the vehicle speed.

Figure 10:
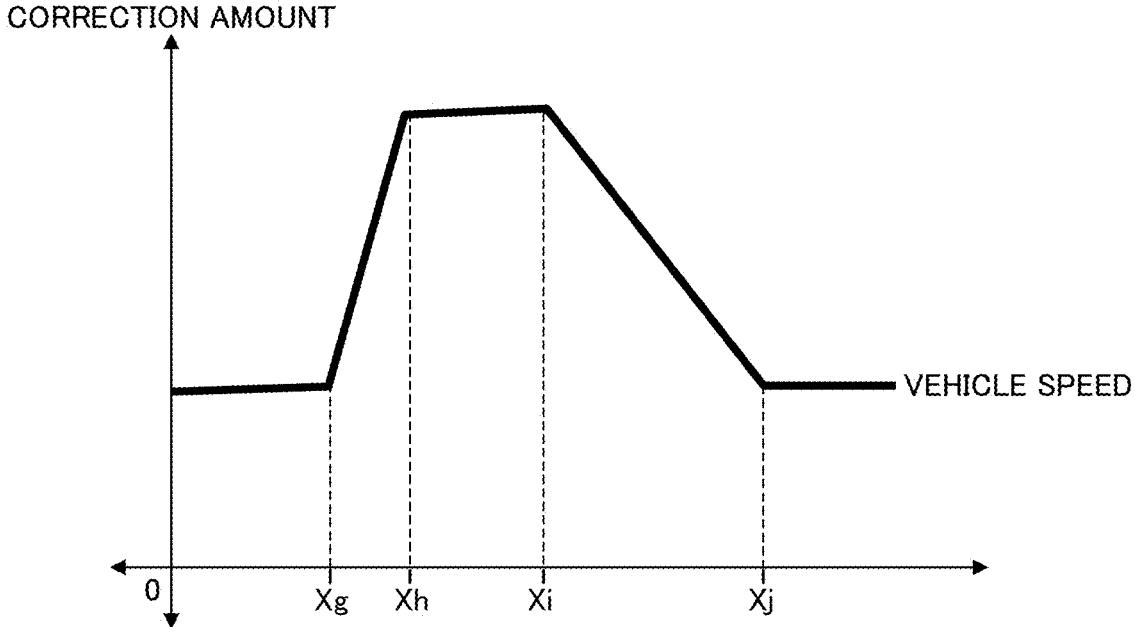
FIG. 10 is a diagram illustrating an example of a map stored in the storage unit.

FIG. 10 is a diagram illustrating an example of a map stored in the storage device 100M. In the map shown in FIG. 10, the horizontal axis represents the vehicle speed and the vertical axis represents the correction amount. The resistive torque correcting unit 180 may refer to the map shown in FIG. 10 to calculate the correction amount the resistive torque corresponding to the vehicle speed obtained by the vehicle speed obtaining unit 130.

The correction amount shown in FIG. 10 may be a ratio of the resistive torque before the correction to the resistive torque after the correction, for example. That is, the assistive torque correcting unit 180 may multiply the resistive torque calculated by the resistive torque calculating unit 170 by the correction amount (ratio) obtained in FIG. 10. Alternatively, the storage device 100M may store a map indicating the correction amount added to (or subtracted from) the resistive torque calculated by the resistive torque calculating unit 170.

When the vehicle speed of the two-wheeled vehicle 1 is high, the two-wheeled vehicle 1 has a gyro effect, and thus, the rotation of the steering shaft 3 (fluctuation of the steering handle 2) caused by the load weight in the front basket 6 or the child seat is unlikely to occur. As such, the map shown in FIG. 10 is designed such that the correction amount of the resistive torque when the vehicle speed is high (first vehicle speed range) is smaller than the correction amount of the resistive torque when the vehicle speed is medium (second vehicle speed range). In FIG. 10, the high speed (first vehicle speed range) is in a vehicle speed range equal to or higher than the vehicle speed xj. In FIG. 10, the medium speed (second vehicle speed range) is a vehicle speed range lower than the first vehicle speed range, and is equal to or higher than the vehicle speed xh and equal to or lower than xi in the example shown in FIG. 10.

The resistive torque in the direction opposite to the rotation direction of the steering shaft 3 is preferably increased when the vehicle speed of the two-wheeled vehicle 1 is the medium speed compared to the case of the high speed. As such, the map shown in FIG. 10 is designed such that when the vehicle speed is the medium speed (when the vehicle speed is within xh to xi of FIG. 10), the correction amount of the resistive torque is larger than the case where the vehicle speed is high speed.

When the vehicle speed of the two-wheeled vehicle 1 is low, the two-wheeled vehicle 1 largely rotates the steering handle 2 and the steering shaft 3, thereby turning in a small radius. In this case, the resistive torque calculated by the control device 100 is preferably reduced so as not to hinder the rotation of the steering shaft 3. As such, in the map shown in FIG. 10, the correction amount of the resistive torque is designed to be small when the vehicle speed is low (when the vehicle speed is equal to or lower than xg in FIG. 10).

Unlike the example shown in FIG. 10, when the vehicle speed is low in the map stored in the storage device 100M, similarly to the case where the vehicle speed is medium, the correction amount of the resistive torque may be designed to be larger compared to the case where the vehicle speed is high.

The control device 100 may calculate the resistive torque based on the shape of the two-wheeled vehicle 1, for example. The control device 100 may calculate the resistive torque based on the weights detected by the weight sensor 40 that detects the weight of the front side (e.g., front basket 6, child seat) and the weight sensor that detects the weight of the rear side (e.g., rear basket attached behind the saddle 8).

In the example described referring to FIG. 10, the resistive torque correcting unit 180 corrects the resistive torque calculated by the resistive torque calculating unit 170. However, the process for calculating the resistive torque is not limited to this example.

For example, the resistive torque calculating unit 170 may directly calculate the resistive torque based on the vehicle turning value and the vehicle speed. In this case, the resistive torque calculating unit 170 may use a three-dimensional or more map, in which the vehicle turning value, the vehicle speed, and the resistive torque are associated to one another, stored in the storage device 100M. Similarly, the resistive torque calculating unit 170 may directly calculate the resistive torque based on the vehicle turning value and the weight. In this case, the resistive torque calculating unit 170 may use a three-dimensional or more map (map that associates the vehicle turning value, the weight, and the resistive torque) stored in the storage device 100M. As described above, the resistive torque calculating unit 170 may directly calculate the assistive torque based on a parameter (e.g., vehicle speed, weight) different from the roll angular velocity.

4-3. Calculation of Output Torque

The output torque calculating unit 190 calculates the output torque to be applied to the steering shaft 3 based on the assistive torque calculated by the assistive torque calculating unit 150 and the assistive torque correcting unit 160 and the resistive torque calculated by the resistive torque calculating unit 170 and the resistive torque correcting unit 180. The output torque calculating unit 190 calculates the output torque by adding or subtracting the assistive torque and the resistive torque.

When the rotation direction of the steering shaft 3 by the assistive torque and the rotation direction of the steering shaft 3 by the resistive torque are opposite to each other, the output torque calculating unit 190 calculates the output torque based on the difference between the assistive torque and the resistive torque (difference between the absolute value of the assistive torque and the absolute value of the resistive torque). The output torque calculating unit 190 may calculate the difference between the absolute value of the assistive torque and the absolute value of the resistive torque as the output torque.

If the resistive torque (absolute value of the resistive torque) is smaller than the assistive torque (absolute value of the assistive torque), the output torque calculating unit 190 calculates the output torque in the same direction as the torque acting on the steering shaft 3 by the operation of the driver. For example, as shown in (1) and (2) of FIG. 4, when the two-wheeled vehicle 1 is tilted to the right from the vertical posture and the roll angular velocity is generated, the output torque calculating unit 190 calculates the output torque in the right rotation (i.e., assistive torque) as the torque to be applied to the steering shaft 3 so as to assist the driver in operating the steering handle 2.

When the resistive torque (absolute value of the resistive torque) is larger than the assistive torque (absolute value of the assistive torque), the output torque calculating unit 190 calculates the output torque in the direction opposite to the direction in which the steering shaft 3 rotates from the neutral position. For example, as shown in (2) of FIG. 4, when the two-wheeled vehicle 1 is tilted to the right and the roll angular velocity is not generated, the output torque calculating unit 190 calculates the output torque in the left rotation as the torque to be applied to the steering shaft 3. With such output torque, it is possible to apply the output torque (i.e. resistive torque) to the steering shaft 3 so that the rotation angle of the steering shaft 3 does not increase.

When the rotation direction of the steering shaft 3 by the assistive torque and the rotation direction of the steering shaft 3 by the resistive torque are in the same direction, the output torque calculating unit 190 may calculate the output torque based on the sum of the assistive torque and the resistive torque. The output torque calculating unit 190 may calculate the sum of the assistive torque and the resistive torque as the output torque.

For example, as shown in (2) and (3) of FIG. 4, when the roll angular velocity in the left direction (change in the roll angle to the vertical posture) is detected while the vehicle body is tilted to the right, the rotation direction of the assistive torque with respect to the steering shaft 3 is the same as the rotation direction of the resistive torque. The output torque calculating unit 190 may calculate the output torque based on the sum of the assistive torque and the resistive torque (the sum of the absolute value of the assistive torque and the absolute value of the resistive torque). In this manner, the large output torque toward the neutral position of the steering handle 2 can be calculated at the end of turning of the two-wheeled vehicle 1 (when the vehicle body is returned from the tilting posture to the vertical posture).

The output torque calculated by the output torque calculating unit 190 may have an upper limit value. For example, the output torque calculated by the output torque calculating unit 190 is preferably of a magnitude that does not eliminate the roll (tilt) of the body of the two-wheeled vehicle 1. This prevents the steering handle 2 from automatically returning to the neutral position contrary to the intention of the driver when the two-wheeled vehicle 1 is turning. This serves to keep the rotation angle of the steering shaft 3 constant as intended by the driver during the turning, and the so-called self-steering can be maintained when the two-wheeled vehicle 1 turns.

The output torque is preferably smaller than the torque acting on the steering shaft 3 due to the weight of the load on the vehicle (e.g., weight of the load in front basket 6, or child seat, etc.). The output torque may be less than ten newton-meters (Nm). More preferably, the output torque may be less than seven newton-meters (Nm). Ten newton-meters (Nm) are less than the torque that typical drivers can exert. As such, the output torque is set to a value of ten newton-meters (Nm) or less, and the driver can thereby rotate the steering handle 2 against the torque that the actuator (electric motor 11 and transmission unit 20) applies to the steering shaft 3.

The control device 100 controls the actuator (more specifically, electric motor 11) based on the output torque calculated by the output torque calculating unit 190. More specifically, the control device 100 outputs a command value (torque command value) corresponding to the output torque calculated by the output torque calculating unit 190 to the motor drive device 16. The motor drive device 16 supplies a current corresponding to the torque command value to the electric motor 11. This drives the electric motor 11 and the transmission mechanism 20, and the torque having the magnitude and the direction corresponding to the output torque is applied to the steering shaft 3.

5. Flowchart

Figure 11:
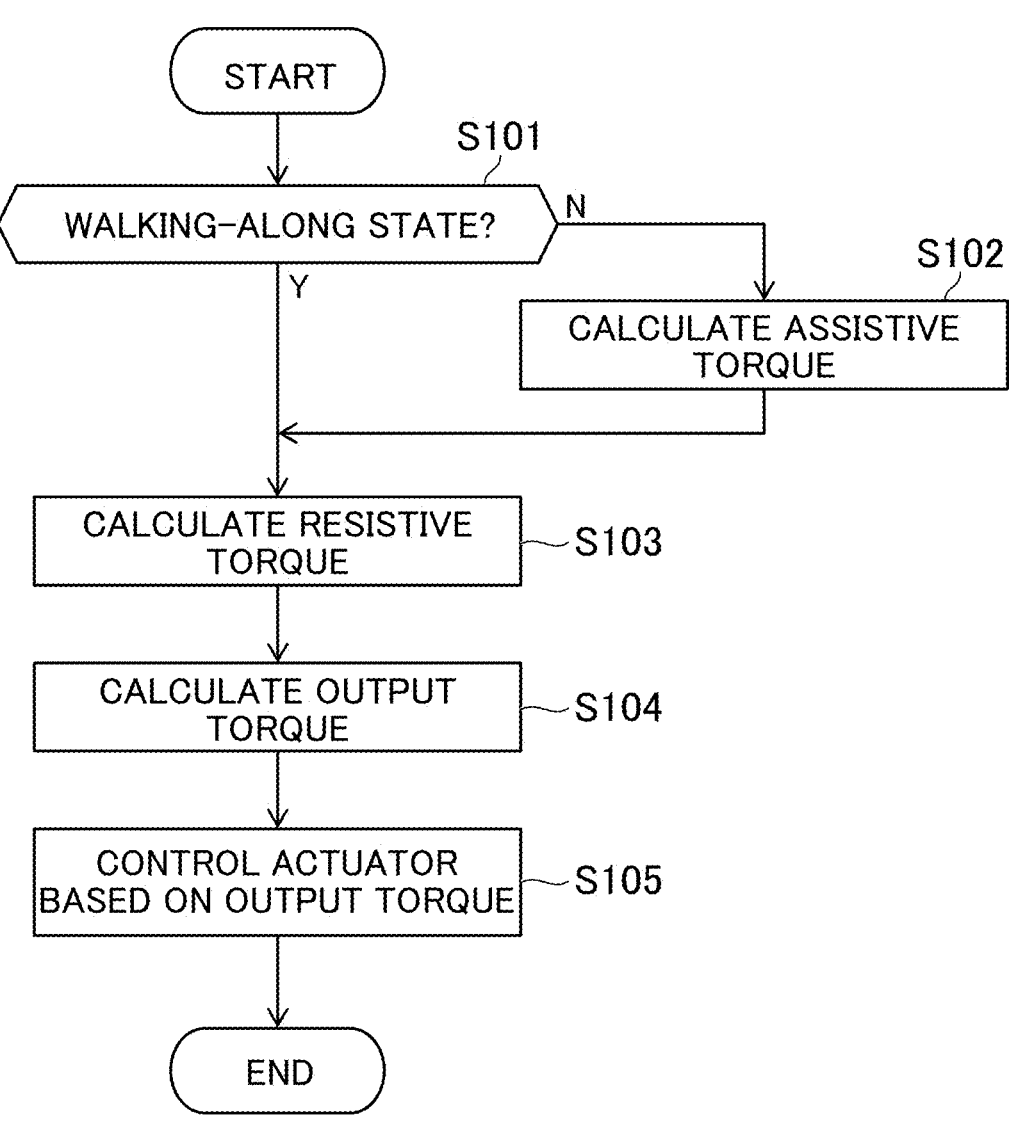
FIG. 11 is a flowchart showing an example of control processing executed by the steering control system.

FIG. 11 is a flowchart showing an example of the control processing executed by the steering control system 10. The steering control system 10 may repeatedly execute the control processing shown in FIG. 11.

As shown in FIG. 11, the control device 100 may determine whether the two-wheeled vehicle 1 is pushed by the driver walking alongside it (S101). Whether the vehicle is pushed in a walking-along state is determined based on the vehicle speed and whether the pedaling force of the driver on the pedal 9a is detected by a sensor (pedaling force sensor), for example. For example, the control device 100 determines that the two-wheeled vehicle 1 is pushed in the walking-along state when the pedaling force by the driver is not applied to the pedal 9a and the vehicle speed is higher than 0, and determines that the two-wheeled vehicle 1 is not pushed in the walking-along state when the pedaling force by the driver is applied to the pedal 9a.

When it is determined that the two-wheeled vehicle 1 is not pushed in the walking-along state (N in S101), the control device 100 may calculate both the assistive torque and the resistive torque. In this case, the assistive torque calculating unit 150 calculates the assistive torque based on the roll angular velocity (S102). The resistive torque calculating unit 170 then calculates the resistive torque based on the vehicle turning value (the roll angle of the two-wheeled vehicle 1 or the rotation angle of the steering shaft 3) (S103). In the processing of step 102, the assistive torque correcting unit 160 may correct the assistive torque calculated by the assistive torque calculating unit 150 based on the vehicle speed and the weight, for example. In the processing of step 103, the resistive torque correcting unit 180 may correct the resistive torque calculated by the resistive torque calculating unit 170 based on the vehicle speed and the weight, for example. The orders to execute the processing of S102 and S103 may be reversed, or the steps S102 and S103 may be executed simultaneously.

When it is determined that the two-wheeled vehicle 1 is pushed in the walking-along state (Y in S101), the control device 100 may calculate only the resistive torque (S103). This can prevent the assistive torque in the direction opposite to the resistive torque from acting on the steering shaft 3.

Next, the control device 100 calculates output torque (S104), and controls the electric motor 11 based on the output torque (S105). When it is determined based on the processing of S101 to S103 that the two-wheeled vehicle 1 is not pushed in the walking-along state (N in S101), in S104, the output torque calculating unit 190 calculates the output torque based on the assistive torque calculated in S102 and the resistive torque calculated in S103. On the other hand, when it is determined that the two-wheeled vehicle 1 is pushed in the walking-along state (N in S101), in S104, the output torque calculating unit 190 calculates the output torque based on the resistive torque calculated in S103. In this case, the output torque calculating unit 190 may calculate the resistive torque calculated in S103 as the output torque.

Not limited to the example of the flowchart shown in FIG. 11, when it is determined that the two-wheeled vehicle 1 is pushed in the walking-along state (Y in S101), the control device 100 may calculate both the resistive torque and the assistive torque or only the assistive torque. In this case, the output torque may be set to substantially zero without calculating the resistive torque and the assistive torque.

6. Conclusion (1) As described above, the steering control system 10 includes an actuator that applies torque to a steering shaft 3, a tilt sensor 60 that detects a roll angular velocity of a vehicle body, and a control device 100. The control device 100 calculates assistive torque, which is directed in a direction corresponding to the roll angular velocity detected by the tilt sensor 60 and has a magnitude corresponding to the roll angular velocity, and controls the actuator based on the assistive torque. This configuration enables an application of appropriate torque to the steering shaft 3 without detecting an operation pressure on a steering handle.

(2) In a case where the roll angular velocity in a right direction is detected, the control device 100 may calculate assistive torque in a direction in which the steering shaft 3 is rotated to right. In a case where the roll angular velocity in a left direction is detected, the control device 100 may calculate assistive torque in a direction in which the steering shaft 3 is rotated to left. This serves to apply the torque in an appropriate direction to the steering shaft 3.

(3) The control device 100 may calculate the assistive torque in a direction in which the steering shaft is rotated to the left in a case where a roll angular velocity in the left direction is detected while the vehicle body is tilted to the right direction from a vertical posture. The control device may calculate the assistive torque in a direction in which the steering shaft is rotated to the right in a case where a roll angular velocity in the right direction is detected while the vehicle body is tilted to the left direction from the vertical posture. This serves to apply the torque for returning the vehicle body to the vertical posture to the steering shaft.

(4) The assistive torque calculated by the control device 100 may increase as the roll angular velocity increases. This serves to apply the torque corresponding to the increase in the roll angular velocity to the steering shaft 3.

(5) In a case where an absolute value of the roll angular velocity is lower than a threshold value, the assistive torque calculated by the control device 100 is substantially zero. This serves to prevent the assistive torque from being applied to the steering shaft 3 due to a minute change in the roll angular velocity.

(6) The control device 100 may calculate resistive torque, which is directed in a direction opposite to a direction in which the steering shaft 3 is rotated from a neutral position and corresponds to a roll angle of the vehicle or a rotation angle of the steering shaft 3. The control device 100 may calculate output torque to be applied to the steering shaft 3 based on the assistive torque and the resistive torque. This serves to apply appropriate torque to the steering shaft in accordance with the state of the two-wheeled vehicle 1.

(7) The control device 100 may calculate the output torque by adding or subtracting the assistive torque and the resistive torque.

(8) The output torque calculated by the control device 100 may have a magnitude that does not eliminate a roll of the vehicle body. This serves to prevent the steering handle 2 from automatically returning to the neutral position contrary to the intention of the driver when the two-wheeled vehicle 1 is turning.

(9) The controller 100 may calculate the assistive torque based on the roll angular velocity and a weight of the vehicle and/or a weight of a load on the vehicle.

(10) The control device 100 may calculate the assistive torque based on the roll angular velocity and a vehicle speed.

(11) The assistive torque to be calculated by the control device 100 may increase as the vehicle speed increases. This serves to effectively reduce the force required for the driver to operate the steering handle 2.

(12) In the steering control system 10, the actuator may include a transmission mechanism 20 that transmits torque to the steering shaft 3. The transmission mechanism 20 may include a member that prevents transmission of torque greater than a threshold value. This enables the driver of the two-wheeled vehicle to operate the steering handle 2 against the torque transmitted to the steering shaft 3.

(13) The actuator may include an electric motor 11. An output shaft 11a of the electric motor 11 may be disposed away from the steering shaft 3. The transmission mechanism 20 may include a belt 23 that transmits torque of the output shaft 11a of the electric motor 11 to the steering shaft 3 as a member that prevents transmission of torque larger than the threshold value. This serves to prevent the torque larger than the threshold value from being transmitted to the steering shaft 3.

The present invention is not limited to the embodiment described above, and various modifications may be made. For example, in the embodiment, the output torque calculating unit 190 calculates the output torque based on the assistive torque and the resistive torque. The output torque calculating unit 190 may also calculate the output torque based only on the assistive torque calculated by the assistive torque calculating unit 150. The output torque calculating unit 190 may calculate the assistive torque corrected by the assistive torque correcting unit 160 as the output torque, for example. This also serves to apply the output torque based on the assistive torque for reducing or canceling the load torque to the steering shaft 3 at the time when the load torque to the steering shaft 3 increases without detecting the operation pressure to the steering wheel.

What is claimed is:

1. A steering control system of a two-wheeled vehicle comprising:

an actuator that applies torque to a steering shaft;

a first sensor that detects a roll angular velocity of a vehicle body;

a second sensor that detects a pedaling force; and a control device that determines whether the vehicle is in a pushing-walking state based on whether the pedaling force is applied to the pedal, and, when it is determined that the vehicle is not in the pushing-walking state, calculates assistive torque, which is directed in a direction corresponding to the detected roll angular velocity and has a magnitude corresponding to the roll angular velocity, and controls the actuator based on the assistive torque.

2. The steering control system of the two-wheeled vehicle according to claim 1, wherein when the roll angular velocity in a right direction is detected, the control device calculates assistive torque in a direction in which the steering shaft is rotated to right, and when the roll angular velocity in a left direction is detected, the control device calculates assistive torque in a direction in which the steering shaft is rotated to left.

3. The steering control system of the two-wheeled vehicle according to claim 2, wherein the control device:

calculates the assistive torque in a direction in which the steering shaft is rotated to the left when a roll angular velocity in the left direction is detected while the vehicle body is tilted to the right direction from a vertical posture; and calculates the assistive torque in a direction in which the steering shaft is rotated to the right when a roll angular velocity in the right direction is detected while the vehicle body is tilted to the left direction from the vertical posture.

4. The steering control system of the two-wheeled vehicle according to claim 1, wherein the assistive torque calculated by the control device increases as the roll angular velocity increases.

5. The steering control system of the two-wheeled vehicle according to claim 4, wherein in a case where an absolute value of the roll angular velocity is lower than a threshold value, the assistive torque calculated by the control device is substantially zero.

6. The steering control system of the two-wheeled vehicle according to claim 1, wherein the control device calculates resistive torque, which is directed in a direction opposite to a direction in which the steering shaft is rotated from a neutral position and corresponds to a roll angle of the vehicle or a rotation angle of the steering shaft, and calculates output torque to be applied to the steering shaft based on the assistive torque and the resistive torque.

7. The steering control system of the two-wheeled vehicle according to claim 6, wherein the control device calculates the output torque by adding or subtracting the assistive torque and the resistive torque.

8. The steering control system of the two-wheeled vehicle according to claim 6, wherein the output torque calculated by the control device has a magnitude that does not eliminate a roll of the vehicle body.

9. The steering control system of the two-wheeled vehicle according to claim 1, wherein the control device calculates the assistive torque based on the roll angular velocity and a weight of the vehicle and/or a weight of a load on the vehicle.

10. The steering control system of the two-wheeled vehicle according to claim 1, wherein the control device calculates the assistive torque based on the roll angular velocity and a vehicle speed.

11. The steering control system of the two-wheeled vehicle according to claim 10, wherein the assistive torque to be calculated by the control device increases as the vehicle speed increases.

12. The steering control system according to claim 1, wherein the actuator includes a transmission mechanism that transmits torque to the steering shaft, and the transmission mechanism includes a member that prevents transmission of the torque larger than a threshold value.

13. The steering control system according to claim 12, wherein the actuator includes an electric motor, an output shaft of the electric motor is disposed away from the steering shaft, and the transmission mechanism includes a belt as a member to prevent the transmission of the torque larger than a threshold value, the belt transmitting the torque of the output shaft of the electric motor to the steering shaft.

\* \* \* \* \*